(12) United States Patent
Sliachina

(10) Patent No.: US 11,520,885 B1
(45) Date of Patent: Dec. 6, 2022

(54) METHOD AND APPARATUS FOR USING A DYNAMIC SECURITY CERTIFICATE

(71) Applicant: UAB 360 IT, Vilnius (LT)

(72) Inventor: Margarita Sliachina, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

(21) Appl. No.: 17/539,352

(22) Filed: Dec. 1, 2021

(51) Int. Cl.
*G06F 21/56* (2013.01)
*H04L 9/32* (2006.01)

(52) U.S. Cl.
CPC .......... *G06F 21/562* (2013.01); *H04L 9/3263* (2013.01); *G06F 2221/2119* (2013.01); *H04L 2209/64* (2013.01)

(58) Field of Classification Search
CPC .......... G06F 21/562; G06F 2221/2119; H04L 9/3263; H04L 2209/64
See application file for complete search history.

(56) References Cited

U.S. PATENT DOCUMENTS

| 8,954,583 B1* | 2/2015 | Zhou | H04L 63/1466 709/224 |
| 2003/0112772 A1* | 6/2003 | Chatterjee | H04B 7/1858 370/316 |
| 2020/0389326 A1* | 12/2020 | Teglas | H04L 9/0861 |

FOREIGN PATENT DOCUMENTS

| CN | 108599959 A * | 9/2018 | ........ H04L 63/0823 |
| WO | WO-2015104567 A1 * | 7/2015 | ........... G06F 21/606 |

\* cited by examiner

*Primary Examiner* — Tri M Tran
(74) *Attorney, Agent, or Firm* — Moser Taboada

(57) ABSTRACT

A method and apparatus for using a dynamic security certificate. The method analyzes a browser to access browser information and generates a dynamic security certificate based on the browser information. The method modifies a configuration file for the browser to cause the browser to trust the dynamic security certificate and inserts the dynamic security certificate into the browser to enable a client application to access encrypted data available to the browser. The method may be performed solely upon a user device or have portions thereof performed by a user device and a server.

17 Claims, 3 Drawing Sheets

METHOD AND APPARATUS FOR USING A DYNAMIC SECURITY CERTIFICATE

FIELD

The present invention relates generally to Internet security protocols, and more particularly to a system and method for using dynamic security certificates.

BACKGROUND

Data traffic flow on the Internet is secured using security certificates (i.e., secure sockets layer (SSL) certificates). Security certificates are supplied to web servers from trusted certificate authorities such that a client application, (e.g., a web browser), executing on a user device may securely access the web server and securely receive data from the web server. Using certificates, the server's data (e.g., web page content) is transmitted using Transport Layer Security (TSL) to send encrypted data to the user device. Unfortunately, the data from a web server may carry a virus or malware which, when received by the user device, may infect the device. Because the data is encrypted until the user device application (e.g., browser) receives the data, any malware or virus detection application executing on the user device has no ability to inspect the encrypted data. Consequently, the encrypted data may carry viruses and malware into the user device.

To provide access to the encrypted data flow for inspection, a user's browser is provided a dynamic or self-signed certificate that can be used to enable anti-malware/virus software to have access to the data. To do so, the anti-malware application generates its own native or "dummy" certificate (e.g., a dynamic or self-signed certificate) and introduces the certificate to the browser to allow the anti-malware application to decrypt the data flow and enable monitoring for malware or viruses.

The dynamic certificates used by an anti-malware application are automatically generated without user input, monitoring or understanding. Since these certificates do not require input from the user or any indication of trust from the user, such certificates may be recognized by the browser application as a security risk. Thus, even if the anti-malware software generates the certificates, the browser application may stop trusting these native certificates and the anti-malware procedures may be halted, or and may cause the browser application to disconnect from the anti-malware application such that the user device is open to malware attacks.

Therefore, there is a need for improved methods and apparatuses for using security certificates.

SUMMARY

A method and apparatus for using a dynamic security certificate. The method determines browser information and creates or receives a dynamic security certificate commensurate with the browser information. The method modifies the browser's configuration file to enable the browser to trust the dynamic security certificate. The dynamic security certificate is then trusted as any certificate disseminated by a trusted certificate authority such that a client application may access encrypted data traffic sent to the browser.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

Figure 1:
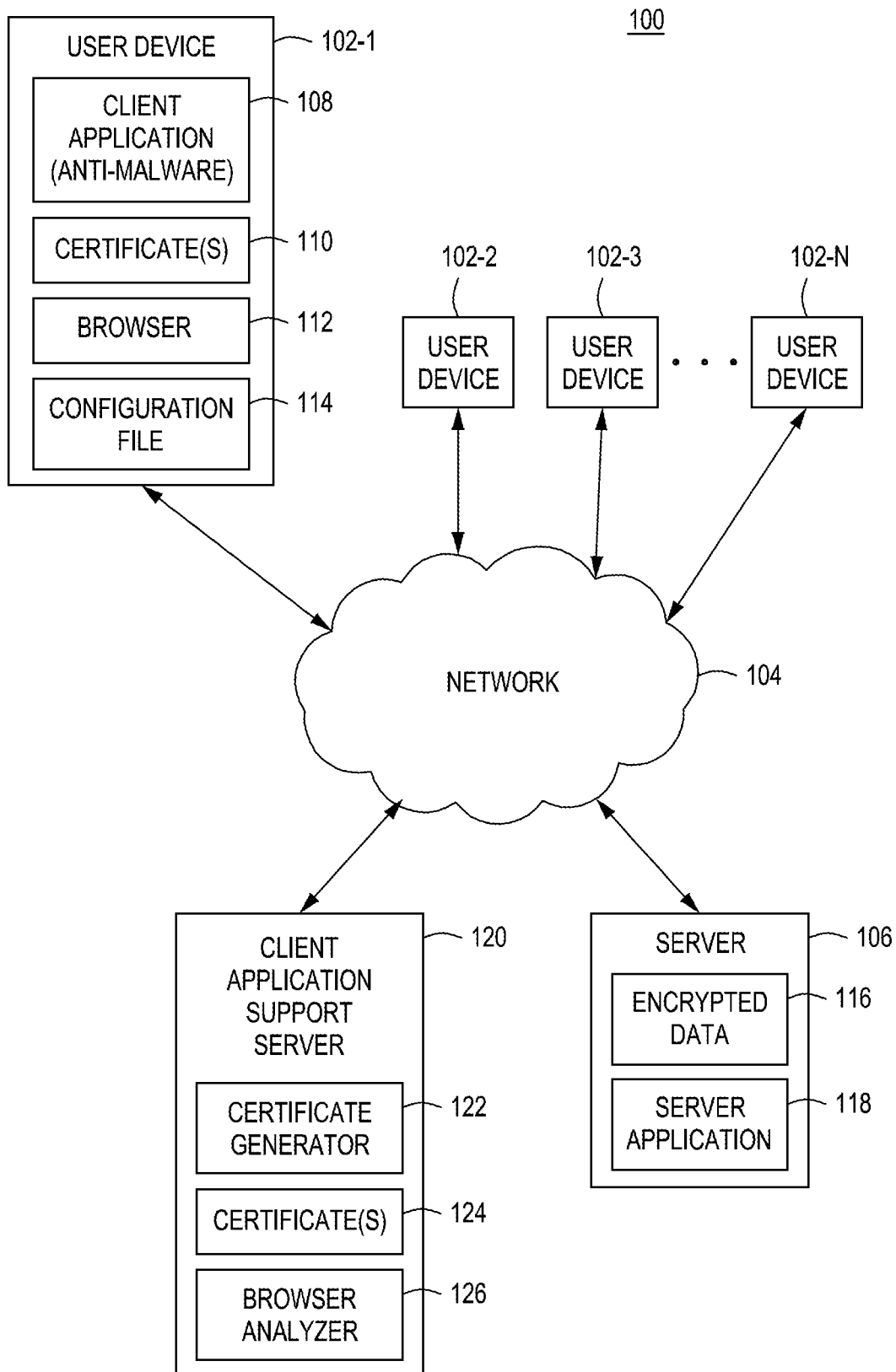
FIG. 1 illustrates an example of a computer system for using a dynamic security certificate in accordance with at least one embodiment of the invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

The following detailed description describes techniques (e.g., methods, processes, apparatuses and systems) for using dynamic security certificates (also known as self-signed certificates). While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims.

Embodiments consistent with the present invention use dynamic security certificates. In some embodiments, upon launch or installation of a client application (e.g., an anti-malware application) that requires access to encrypted data (content) being supplied to a browser, the client application analyzes a browser on the user device to determine browser information, e.g., one or more of a browser model, a browser version, a browser configuration file location, and/or the like. Using the browser information, the client application creates a dynamic security certificate and modifies the browser's configuration file to accept the dynamic security certificate as a trusted certificate. By introducing/installing the client application (e.g., anti-malware application) generated certificates directly to the browser registry itself, the trust in the certificates by the browser application is elevated. Once the certificate is installed, the client application may decrypt the data (content) being supplied to the browser and search the data for, for example, malware or viruses.

In another embodiment, the browser analysis and certificate creation may be performed by a server that supports the client application. The server supplies the certificate to the client application, the client application modifies the browser's configuration file and installs the certificate. Once the certificate is installed, the client application may decrypt the data (content) being supplied to the browser and search the data for, for example, malware or viruses. In some embodiments, the certificates are installed by one or more of modifying the browser's configuration files or information, registering them in the browser's registry, or by patching the browser. For example, the certificate can be installed by modifying configuration files in the registry, or by modifying the browser's certificate database. To modify the database, some additional tools may be required, such as "certutil" or other command line tools for manipulating certification authority data. This approach requires administrator access and may not be supported by all browsers.

Thus, methods and apparatuses consistent with embodiments of this present invention using dynamic security certificates. Such certificates may be used to facilitate data flow monitoring to/from a user device. Details of such methods and apparatuses are described in detail below with respect to the figures.

FIG. 1 illustrates an example of a computer system 100 for using a dynamic security certificate in accordance with at least one embodiment of the invention. In FIG. 1, the system 100 comprises at least one user device 102, a server 106 and a computer network 104, (e.g., the Internet) connecting the server 106 to the user devices 102. The server 106 is a centralized computing device used to execute application(s) (server application 118) and communicate encrypted data 116 (i.e., content) to/from user devices 102. In an alternative embodiment, the system 100 further comprises a client application support server 120 that supports a client application 108 executing on the user device 102 such that the client application may use a dynamic security certificate as described below. The general structure of such servers and/or user devices is described in detail below with respect to FIG. 3.

User devices 102-1, 102-2, 102-3 . . . 102-N (collectively referred to as user devices 102) communicate through network 104 with the server 106. In some embodiments, user device 102 can be any computing device capable of hosting a client application 108 and browser 112. In some embodiments, the client application 108 may be any application requiring access to the encrypted data received by the browser 112, such as an anti-malware or anti-virus application. User device 102 may comprise any device that is connected to a network, including, for example, a laptop, a mobile phone, a tablet computer, a desktop computer, a smart device, a router and other network devices. Each user device 102 comprises a browser 112, at least one certificate 110 and a client application (anti-malware) 108. In one embodiment, the client application 108 may comprise its own certificate generator 122, or the certificate generator 122 may be located in the client application support server 120. The browser 112 is a well known application for accessing and displaying web page content. Such browsers include, but are not limited to, Safari®, Chrome®, Explorer®, Firefox®, etc.

In operation, the client application 108 may be, for example, an anti-malware application that, to effectively protect the user device 102, requires access to encrypted data flowing to the browser 112 in the user device 102. The client application 108 uses a dynamic security certificate(s) to decrypt the data and enable the application to inspect the data for malware or viruses. To use the certificate, the client application 108 modifies the browser's configuration file 114 to install the certificate 110 as a trusted certificate. Such modifications may include, but are not limited to, enabling self-signed certificates, setting a path to the certificate, and writing a certificate installation command. For example, a Firefox browser configuration file may be modified to include:

"policies": {
"Certificates": {
"ImportEnterpriseRoots": true,
"Install": ["/path/to/certificate"]
}
}

To effectuate the modification, the browser may require restarting such that the certificate will be installed and used by the browser.

In an alternative embodiment, the client application, when installed or upon launch, communicates with the client application support server 120. The server 120 executes a browser analyzer 126 to remotely discover the browser information, e.g., browser model, version, location of configuration file, etc. The browser information is used by the certificate generator 122 to create a dynamic security certificate 124 that will function with the specified browser to enable the client application 108 to decrypt data being received by the browser 112. The certificate 124 is communicated through the network 104 to the user device 102 for use by the client application 108. The client application 108 then modifies the browser's configuration file 114 to facilitate use of the dynamic security certificate 110 received from the client application support server 120.

Figure 2:
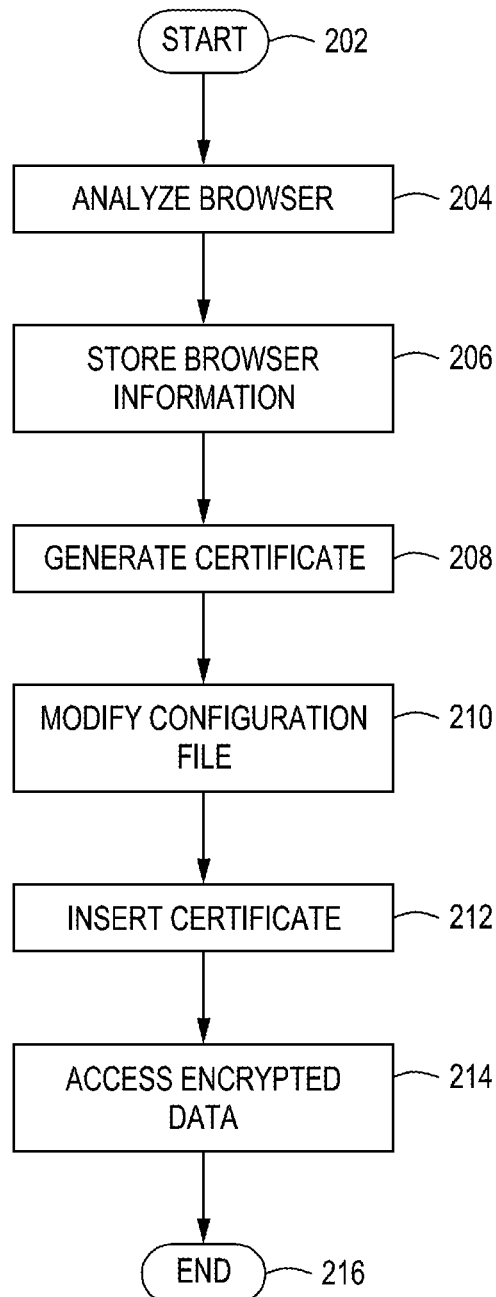
FIG. 2 depicts a flow diagram of a method for using a dynamic security certificate in accordance with at least one embodiment of the present invention.

FIG. 2 illustrates an exemplary flow diagram representing one or more of the processes as described herein. Each block of the flow diagram may represent a module of code to execute and/or combinations of hardware and/or software configured to perform one or more processes described herein. Though illustrated in a particular order, the following figures are not meant to be so limiting. Any number of blocks may proceed in any order (including being omitted) and/or substantially simultaneously (i.e., within technical tolerances of processors, etc.) to perform the operations described herein.

FIG. 2 is a flow diagram of a method 200 for using a dynamic security certificate in accordance with at least one embodiment of the present principles. In some embodiments, method 200 is executed upon installation or launch of a client application (e.g., anti-malware application) and, in other embodiments, the method 200 may be executed when an expired security certificate requires replacement. In some embodiments, the method 200 begins at 202 and proceeds to 204 where the browser in the user device is analyzed. The analysis may be performed remotely from a client application support server (120 in FIG. 1) or from the client application (108 in FIG. 1) within the user device. In either instance, the analysis determines browser information including, but not limited to, for example, browser model, browser version, browser configuration file location, etc. In some instances, the browser information is available from the user device operating system.

At 206, the method 200 stores the browser information in memory. At 208, the browser information is used to generate a dynamic security certificate that will be trusted by the browser and enable the client application to decrypt data being received by the browser such that malware or viruses may be detected. At 210, the client application modifies the browser's configuration file to enable the browser to trust the certificate. At 212, the method 200 inserts the certificate into the browser. Because the dynamic security certificate is trusted, the browser treats the dynamic certificate as if it were received from a Certificate Authority. At 214, the certificate is used by the client application to access the encrypted data, decrypt the data that is streaming to the browser and inspect the decrypted data for malware, viruses, or any other abnormal data within the data stream. In this manner, the user device is kept safe from malware and viruses that would otherwise infect the user device. The method 200 ends at 216.

Figure 3:
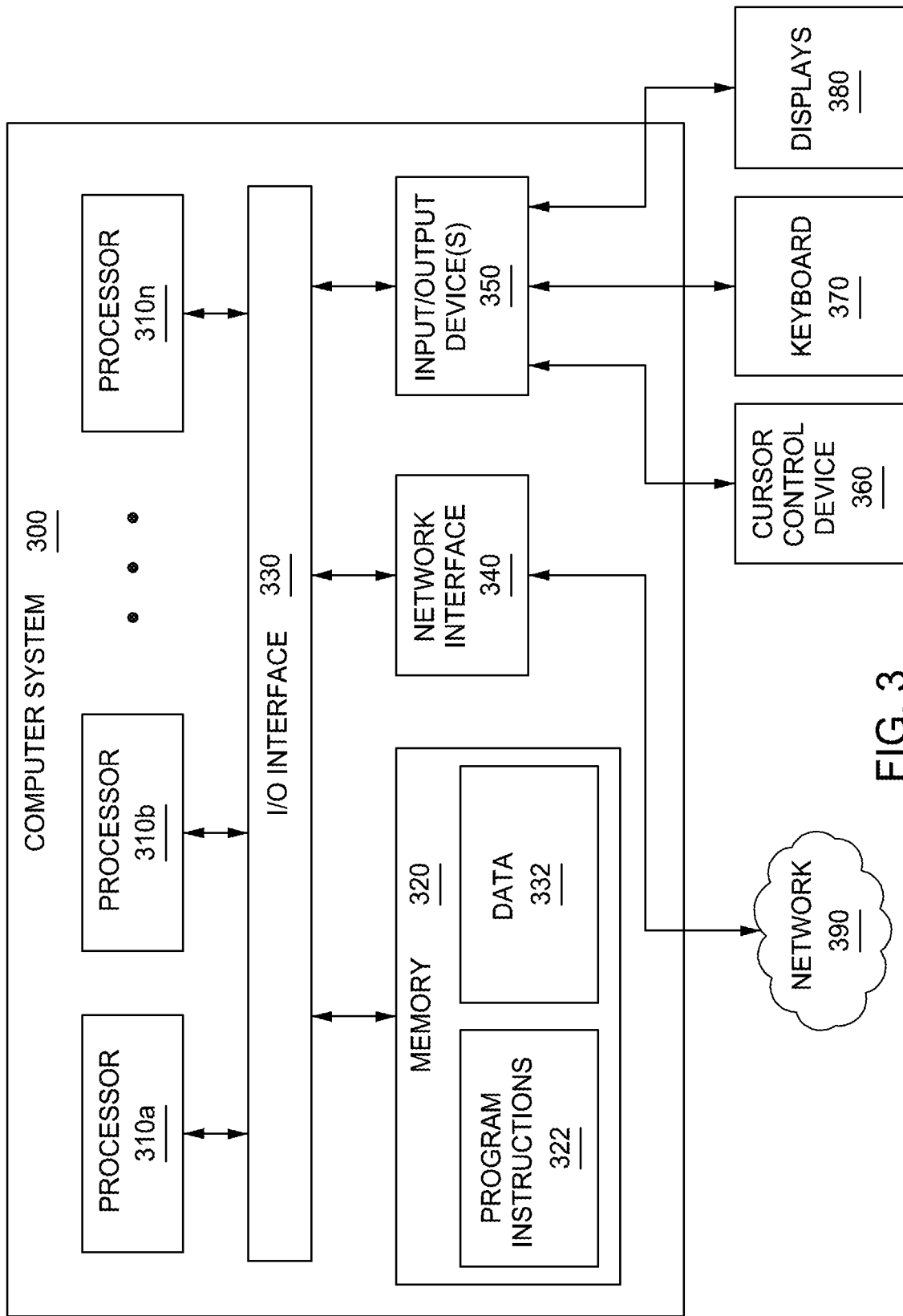
FIG. 3 depicts a high-level block diagram of a computing device suitable for use with embodiments of a system for using a dynamic security certificate in accordance with at least one embodiment of the invention.

FIG. 3 depicts a computer system 300 that can be utilized in various embodiments of the present invention to implement the computer and/or the display, according to one or more embodiments.

Various embodiments of method and system for generating a dynamic secure certificate, as described herein, may be executed on one or more computer systems, which may interact with various other devices. One such computer system is computer system 300 illustrated by FIG. 3, which may in various embodiments implement any of the elements or functionality illustrated in FIGS. 1 and 2. In various embodiments, computer system 300 may be configured to implement methods described above. The computer system 300 may be used to implement any other system, device, element, functionality or method of the above-described embodiments. In the illustrated embodiments, computer system 300 may be configured to implement the user devices 102 and servers 106 and/or 120 and implement the method 200 as processor-executable executable program instructions 322 (e.g., program instructions executable by processor(s) 310) in various embodiments.

In the illustrated embodiment, computer system 300 includes one or more processors 310a-310n coupled to a system memory 320 via an input/output (I/O) interface 330. Computer system 300 further includes a network interface 340 coupled to I/O interface 330, and one or more input/output devices 350, such as cursor control device 360, keyboard 370, and display(s) 380. In various embodiments, any of the components may be utilized by the system to receive user input described above. In various embodiments, a user interface may be generated and displayed on display 380. In some cases, it is contemplated that embodiments may be implemented using a single instance of computer system 300, while in other embodiments multiple such systems, or multiple nodes making up computer system 300, may be configured to host different portions or instances of various embodiments. For example, in one embodiment some elements may be implemented via one or more nodes of computer system 300 that are distinct from those nodes implementing other elements. In another example, multiple nodes may implement computer system 300 in a distributed manner.

In different embodiments, computer system 300 may be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 300 may be a uniprocessor system including one processor 310, or a multiprocessor system including several processors 310 (e.g., two, four, eight, or another suitable number). Processors 310 may be any suitable processor capable of executing instructions. For example, in various embodiments processors 310 may be general-purpose or embedded processors implementing any of a variety of instruction set architectures (ISAs). In multiprocessor systems, each of processors 310 may commonly, but not necessarily, implement the same ISA.

System memory 320 may be configured to store program instructions 322 and/or data 332 accessible by processor 310. In various embodiments, system memory 320 may be implemented using any non-transitory computer readable media including any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 320. In other embodiments, program instructions and/or data may be received, sent or stored upon different types of computer-accessible media or on similar media separate from system memory 320 or computer system 300.

In one embodiment, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any necessary protocol, timing or other data transformations to convert data signals from one component (e.g., system memory 320) into a format suitable for use by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. Also, in some embodiments some or all of the functionality of I/O interface 330, such as an interface to system memory 320, may be incorporated directly into processor 310.

Network interface 340 may be configured to allow data to be exchanged between computer system 300 and other devices attached to a network (e.g., network 390), such as one or more external systems or between nodes of computer system 300. In various embodiments, network 390 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 340 may support communication via wired or wireless general data networks, such as any suitable type of Ethernet network, for example; via digital fiber communications networks; via storage area networks such as Fiber Channel SANs, or via any other suitable type of network and/or protocol.

Input/output devices 350 may, in some embodiments, include one or more display terminals, keyboards, keypads, touchpads, scanning devices, voice or optical recognition devices, or any other devices suitable for entering or accessing data by one or more computer systems 300. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

In some embodiments, the illustrated computer system may implement any of the operations and methods described above, such as the method illustrated by the flowchart of FIG. 2. The method 200 of FIG. 2 may be implemented in the user device or may be implemented partially in the user device and partially in the server 120. In other embodiments, different elements and data may be included.

Those skilled in the art will appreciate that computer system 300 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 300 may be transmitted to computer system 300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

Example Clauses

A. A method for using a dynamic security certificate comprising:

analyzing a browser to access browser information;
generating a dynamic security certificate based on the browser information;
modifying a configuration file for the browser to cause the browser to trust the dynamic security certificate;
inserting the dynamic security certificate into the browser; and
accessing encrypted data available to the browser.

B. The method of clause A, wherein the browser information comprises one or more of a browser model, a browser version or a browser configuration file location.

C. The method of clauses A or B, wherein modifying the configuration file comprises enabling self-signed certificates, setting a path to the dynamic security certificate, and writing a certificate installation command.

D. The method of clauses A-C, wherein accessing encrypted data further comprises decrypting the encrypted data using the dynamic security certificate.

E. The method of clauses A-D, further comprising inspecting the decrypted data for malware or viruses.

F. The method of clauses A-E, wherein the method is performed by a user device executing a client application.

G. The method of clauses A-F, wherein the analyzing and generating are performed remotely by a server accessing a user device and wherein modifying, inserting and accessing are performed by the user device executing a client application.

H. Apparatus for using a dynamic security certificate comprising at least one processor coupled to at least one non-transitory computer readable medium having instructions stored thereon, which, when executed by the at least one processor, cause the at least one processor to perform operations comprising:
analyzing a browser to access browser information;
generating a dynamic security certificate based on the browser information;
modifying a configuration file for the browser to cause the browser to trust the dynamic security certificate;
inserting the dynamic security certificate into the browser; and
accessing encrypted data available to the browser.

I. The apparatus of clause H, wherein the browser information comprises one or more of a browser model, a browser version or a browser configuration file location.

J. The apparatus of clauses H or I, wherein modifying the configuration file comprises enabling self-signed certificates, setting a path to the dynamic security certificate, and writing a certificate installation command.

K. The apparatus of clauses H-J, wherein accessing encrypted data further comprises decrypting the encrypted data using the dynamic security certificate.

L. The apparatus of clauses H-K, further comprising inspecting the decrypted data for malware or viruses.

M. The apparatus of clauses H-L, wherein the at least one processor is located with a user device.

N. The apparatus of clauses H-M, wherein the operations are performed by a user device executing a client application.

O. The apparatus of clauses H-N, wherein the analyzing and generating operations are performed remotely by a server accessing a user device and wherein modifying, inserting and accessing operations are performed by the user device executing a client application.

P. Apparatus for using a dynamic security certificate comprising:
a user device communicatively coupled to a server communicatively through a network;
the server comprising at least one server processor coupled to at least one non-transitory computer readable medium having instructions stored thereon, which, when executed by the at least one server processor, cause the at least one server processor to perform server operations comprising:
analyzing a browser, executing one the user device, to access browser information;
generating a dynamic security certificate based on the browser information;
communicating the dynamic security certificate to the user device;
the user device comprising at least one user device processor coupled to at least one non-transitory computer readable medium having instructions stored thereon, which, when executed by the at least one user device processor, cause the at least one user device processor to perform user device operations comprising:
modifying a configuration file for the browser to cause the browser to trust the dynamic security certificate;
inserting the dynamic security certificate into the browser; and
accessing encrypted data available to the browser.

Q. The apparatus of clause P, wherein the browser information comprises one or more of a browser model, a browser version or a browser configuration file location.

R. The apparatus of clauses P or Q, wherein modifying the configuration file comprises enabling self-signed certificates, setting a path to the dynamic security certificate, and writing a certificate installation command.

S. The apparatus of clauses P-R, wherein accessing encrypted data further comprises decrypting the encrypted data using the dynamic security certificate.

T. The apparatus of clauses P-S, further comprising inspecting the decrypted data for malware or viruses.

What is claimed is:

1. A method for using a dynamic security certificate comprising:
remotely analyzing, by a server, a browser to access browser information on a device;
generating, using the server, a dynamic security certificate based on the browser information;
modifying, using an anti-malware application on the device, a configuration file for the browser to cause the browser to trust the dynamic security certificate;
inserting, by the anti-malware application, the dynamic security certificate into the browser; and
accessing, by the anti-malware application, encrypted data available to the browser using the inserted dynamic security certificate.

2. The method of claim 1, wherein the browser information comprises one or more of a browser model, a browser version or a browser configuration file location.

3. The method of claim 1, wherein modifying the configuration file comprises enabling self-signed certificates, setting a path to the dynamic security certificate, and writing a certificate installation command.

4. The method of claim 1, wherein accessing encrypted data further comprises decrypting the encrypted data using the dynamic security certificate.

5. The method of claim 4, further comprising inspecting the decrypted data for malware or viruses.

6. The method of claim 1, wherein the method is performed by a user device executing a client application.

7. Apparatus for using a dynamic security certificate comprising at least one processor coupled to at least one non-transitory computer readable medium having instructions stored thereon, which, when executed by the at least one processor, cause the at least one processor to perform operations comprising:

communicating a browser to a remote server for analyzing the browser to access browser information and for generating a dynamic security certificate based on the browser information;

modifying, using an anti-malware application on the apparatus, a configuration file for the browser to cause the browser to trust the dynamic security certificate;

inserting, by the anti-malware application, the dynamic security certificate into the browser; and accessing, by the anti-malware application, encrypted data available to the browser using the inserted dynamic security certificate.

8. The apparatus of claim 7, wherein the browser information comprises one or more of a browser model, a browser version or a browser configuration file location.

9. The apparatus of claim 7, wherein modifying the configuration file comprises enabling self-signed certificates, setting a path to the dynamic security certificate, and writing a certificate installation command.

10. The apparatus of claim 7, wherein accessing encrypted data further comprises decrypting the encrypted data using the dynamic security certificate.

11. The apparatus of claim 8, wherein the at least one processor further comprising inspecting the decrypted data for malware or viruses.

12. The apparatus of claim 7, wherein the at least one processor is located with a user device.

13. Apparatus for using a dynamic security certificate comprising:

a user device communicatively coupled to a server communicatively through a network;

the server comprising at least one server processor coupled to at least one non-transitory computer readable medium having instructions stored thereon, which, when executed by the at least one server processor, cause the at least one server processor to perform server operations comprising:

analyzing a browser, executing on the user device, to access browser information;

generating a dynamic security certificate based on the browser information;

communicating the dynamic security certificate to the user device;

the user device comprising at least one user device processor coupled to at least one non-transitory computer readable medium having instructions stored thereon, which, when executed by the at least one user device processor, cause the at least one user device processor to perform user device operations comprising:

modifying, using an anti-malware application on the user device, a configuration file for the browser to cause the browser to trust the dynamic security certificate;

inserting, by the anti-malware application, the dynamic security certificate into the browser; and accessing, by the anti-malware application, encrypted data available to the browser using the inserted dynamic security certificate.

14. The apparatus of claim 13, wherein the browser information comprises one or more of a browser model, a browser version or a browser configuration file location.

15. The apparatus of claim 13, wherein modifying the configuration file comprises enabling self-signed certificates, setting a path to the dynamic security certificate, and writing a certificate installation command.

16. The apparatus of claim 13, wherein accessing encrypted data further comprises decrypting the encrypted data using the dynamic security certificate.

17. The apparatus of claim 16, wherein the at least one user device processor further comprising inspecting the decrypted data for malware or viruses.

\* \* \* \* \*